Figure 1:
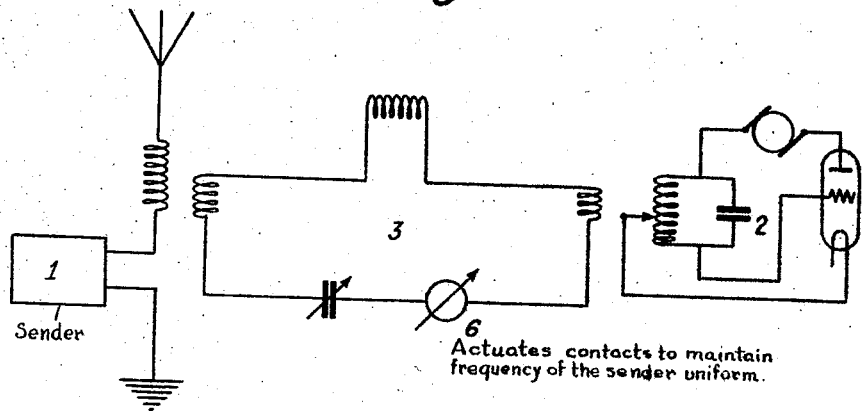

Feb. 20, 1923.

W. SCHAFFER 1,446,433

CIRCUIT ARRANGEMENT FOR INDICATING THE DEVIATION OF A SENDER FROM A DESIRED FREQUENCY

Filed Aug. 3, 1922

Actuates contacts to maintain frequency of the sender uniform.

Inventor
WALTER SCHAFFER
By his Attorney

Patented Feb. 20, 1923.

1,446,433

UNITED STATES PATENT OFFICE.

WALTER SCHAFFER, OF BERLIN, GERMANY.

CIRCUIT ARRANGEMENT FOR INDICATING THE DEVIATION OF A SENDER FROM A DESIRED FREQUENCY.

Application filed August 3, 1922. Serial No. 579,384.

*To all whom it may concern:*

Be it known that I, WALTER SCHAFFER, a citizen of the Republic of Germany, and a resident of Hallesches Ufer 12/13, Berlin, S. W., 11, Germany, have invented new and useful Improvements in Circuit Arrangements for Indicating the Deviation of a Sender from a Desired Frequency (for which I have filed application in Germany Aug. 2, 1921), of which the following is a specification, accompanied by drawings.

If two senders operate jointly at the same frequency on an oscillating circuit, a phase displacement of 180° occurs between them. The weaker of the two senders is usually forced into or held in a 180° phase displacement by the more powerful sender. If the wave individual to the weaker sender is now slightly detuned with respect to the more powerful sender, the frequency of the oscillating wave does not vary but apparently only the phase displacement of the two senders with respect to each other is changed. Consequently, a measuring instrument provided in a circuit coupled with the two senders will register the variation. If, on the other hand, there is a variation in the wave of the more powerful sender, that is, the working sender, then this will have a corresponding effect on the auxiliary sender, the phase displacement being varied at the same time. The resulting variation in the current may then be used as a measure for the changes occurring in the wave, and the change in the output of the circuit may be used for correcting the occurring frequency variation.

The present invention makes use of these occurrences for automatically indicating or correcting the deviation of a sender from the wave of the desired frequency.

Figure 2:
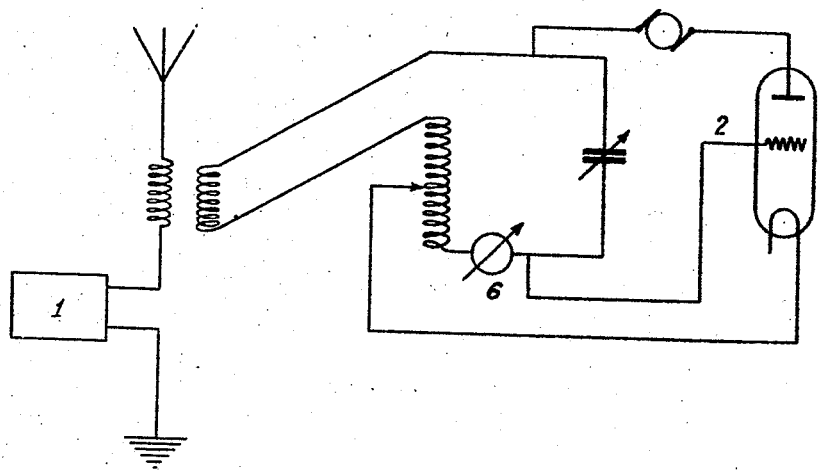

In the drawing,

Fig. 1 is a diagrammatic representation of a circuit arrangement embodying the invention, and Fig. 2 is a diagrammatic representation of a modified form of the invention.

Referring to Fig. 1, the reference numeral 1 designates an undamped working sender of any well known type, 2 is a cathode tube auxiliary sender and 3 is a tuned or untuned circuit coupled with 1 and 2 in which the measuring instrument 6 is provided.

It makes no difference whether the measuring or instrument circuit 3 is periodic or aperiodic. In accordance with Fig. 2 it is even possible to actuate the auxiliary sender without the use of such circuit.

The momentary deviation from the frequency within the phase range may be acoustically determined, a very loose coupling being used. The use of a loose coupling makes possible the employment of a mechanically operating measuring instrument provided with a scale gaged in a static manner in order to make possible the direct reading of the wave deviations.

In order to make possible the reading of both positive and negative variations in the wave of the working sender, the instrument 6 is preferably so adjusted that it gives the same indication irrespective whether one or both senders actuate the instrument circuit.

An increase in the reading of the instrument indicates an increase in the wave length and a shortening in the movement of the instrument, a shortening of the wave length.

The sensitiveness of the measuring arrangement may be increased or decreased within the desired limits by increasing or decreasing the looseness of the coupling.

In order to make possible the use of the arrangement for the purpose of automatically correcting variations in the wave frequencies within predetermined limits, the indicating instrument itself or in its stead a relay arrangement is used for the purpose of actuating certain contacts provided for this purpose.

Having described my invention, what I claim is:

1. A circuit arrangement for indicating the deviation of a sender from a desired wave frequency comprising an oscillating circuit, a working sender and an auxiliary sender of like wave frequency to the working sender operable on said oscillating circuit, said senders being of different degrees of power so that the more powerful sender operates normally to force the other into a 180° phase displacement and said auxiliary sender being of normally constant frequency so as to cause the current in the oscillating circuit to vary in accordance with variations in the wave frequency of the working sender.

2. A circuit arrangement for indicating the deviations of a sender from a desired wave frequency comprising a working sender and an auxiliary sender coupled to the working sender, of like frequency to the working sender and of a different degree of power from the working sender, said auxiliary sender being of constant frequency so that the resultant current from said senders is caused to vary in accordance with variations in the wave frequency of the working sender.

3. A circuit arrangement for indicating the deviations of a sender from a desired wave frequency comprising a working sender, an auxiliary sender coupled to the working sender, of like frequency to the working sender and of a different degree of power from the working sender, said auxiliary sender being of constant frequency so that the resultant current from said senders is caused to vary in phase in accordance with variations in the wave frequency of the working sender, and a measuring instrument for determining variations in said current.

4. A circuit arrangement for indicating the deviation of a sender from a desired wave frequency comprising an oscillating circuit, a working sender and auxiliary sender of like wave frequency to the working sender operable on said oscillating circuit, said senders being of different degrees of power so that the more powerful sender operates normally to force the other into a 180° phase displacement and said auxiliary sender being of normally constant frequency so as to cause the current in the oscillating circuit to vary in phase within a certain range in accordance with variations in the wave frequency of the working sender, and a measuring instrument in the oscillating circuit operating in accordance with the difference in the phase.

5. A circuit arrangement for indicating the deviation of a sender from a desired wave frequency comprising an oscillating circuit, a working sender and an auxiliary sender of like wave frequency to the working sender operable on said oscillating circuit, said working sender being more powerful than the auxiliary sender so as normally to force the auxiliary sender into a 180° phase displacement and said auxiliary sender being of normally constant frequency so as to cause the current in the oscillating circuit to vary in accordance with variations in the wave frequency of the working sender, and a measuring instrument coupled to the oscillating circuit so as to receive the same amount of current from both senders.

6. A circuit arrangement for indicating the deviation of a sender from a desired wave frequency comprising an oscillating circuit, a working sender and an auxiliary sender of like wave frequency to the working sender operable on said oscillating circuit, said working sender being more powerful than the auxiliary sender so as to normally force the auxiliary sender into a 180° phase displacement and said auxiliary sender being of normally constant frequency so as to cause the current in the oscillating circuit to vary in accordance with variations in the wave frequency of the working sender, and means for actuating contacts for maintaining the wave frequency of the working sender uniform.

7. A circuit arrangement for indicating the deviation of a sender from a desired wave frequency comprising an oscillating circuit, a working sender and an auxiliary sender of like wave frequency to the working sender operable on said oscillating circuit, and means for measuring the current in said oscillating circuit, said working sender being more powerful than the auxiliary sender so as to tend to force the auxiliary sender into a 180° phase displacement and said auxiliary sender being of normally constant frequency and being tuned with respect to the working sender, so that its individual wave is displaced from a 180° phase relation with respect to the working sender, thereby causing the indicating means of the measuring instrument to move in one direction or the other according as the wave frequency of the working sender increases or decreases.

8. A circuit arrangement for indicating the deviation of a sender from a desired wave frequency comprising an oscillating circuit, a working sender and an auxiliary sender of like wave frequency to the working sender operable on said oscillating circuit, and means for measuring the current in said oscillating circuit, said working sender being more powerful than the auxiliary sender so as to tend to force the auxiliary sender into a 180° phase displacement and said auxiliary sender being of normally constant frequency and being tuned with respect to the working sender in such a relation that, when both of the senders are being operated, the reading of the instrument will be the same as though only one sender was being operated, so as to enable the circuit arrangement to be used while impulses are being sent by the working sender and to cause the indicating means of the measuring instrument to move in one direction or the other according as the wave frequency of the working sender increases or decreases.

WALTER SCHAFFER.